US008950264B2

(12) United States Patent
Nam et al.

(10) Patent No.: US 8,950,264 B2
(45) Date of Patent: Feb. 10, 2015

(54) JIG DEVICE USABLE WITH FLAT DISPLAY PANEL AND ENDURANCE TEST METHOD USING THE SAME

(75) Inventors: Jin Woo Nam, Suwon-si (KR); Byung Joo Paek, Suwon-si (KR); Dong Jun Kim, Hwaseong-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 922 days.

(21) Appl. No.: 12/984,667

(22) Filed: Jan. 5, 2011

(65) Prior Publication Data

US 2011/0192230 A1    Aug. 11, 2011

(30) Foreign Application Priority Data

Feb. 8, 2010   (KR) ................. 10-2010-0011426

(51) Int. Cl.
    *G01M 7/02*    (2006.01)
(52) U.S. Cl.
    CPC ................................. *G01M 7/027* (2013.01)
    USPC ............................................ 73/663; 73/432.1
(58) Field of Classification Search
    USPC ............... 73/663, 664, 432.1, 866.3, 865.9,
                       73/12.09; 269/287–288, 329
    See application file for complete search history.

(56) References Cited

U.S. PATENT DOCUMENTS

| 4,912,980 A * | 4/1990 | Baughn ......................... 73/663 |
| 5,014,000 A * | 5/1991 | Schlagheck ..................... 73/663 |
| 2009/0031816 A1 * | 2/2009 | Henderson et al. ............. 73/663 |
| 2009/0056458 A1 * | 3/2009 | Ma ................................. 73/663 |
| 2009/0165532 A1 * | 7/2009 | Yee et al. ..................... 73/12.09 |

FOREIGN PATENT DOCUMENTS

| CN | 201094097 | | 7/2008 |
| CN | 101470046 | | 7/2009 |
| KR | 2006057072 A | * | 5/2006 |
| KR | 2007010858 A | * | 1/2007 |

OTHER PUBLICATIONS

English translation of Chinese Office Action dated Mar. 19, 2014 in corresponding Chinese Application No. 201110033554.8.
English translation of Taiwanese Office Action dated Nov. 21, 2013 in corresponding Taiwanese Application No. 100102612, and also referred to as Taiwanese Publication No. 10221599060.

* cited by examiner

*Primary Examiner* — Peter Macchiarolo
*Assistant Examiner* — Rose M Miller
(74) *Attorney, Agent, or Firm* — Staas & Halsey LLP

(57) ABSTRACT

A jig device usable with a flat display panel which includes a frame including a base frame having an opening and a vertical frame which extends vertically along a perimeter of the base frame and a supporting frame coupled to the base frame within the frame, on which the flat display panel is disposed, wherein the supporting frame includes fixing portions provided at corners thereof to support respective corners of the flat display panel.

22 Claims, 7 Drawing Sheets

JIG DEVICE USABLE WITH FLAT DISPLAY PANEL AND ENDURANCE TEST METHOD USING THE SAME

CROSS-REFERENCE TO RELATED APPLICATIONS

This application claims the benefit of priority under 35 U.S.C. §119 to Korean Patent Application No. 2010-0011426, filed on Feb. 8, 2010 in the Korean Intellectual Property Office, the disclosure of which is incorporated herein in its entirety by reference.

BACKGROUND

1. Field of the Invention

Embodiments of the present general inventive concept relate to a jig device for an endurance test of a flat display panel.

2. Description of the Related Art

Generally, flat display panels, such as Liquid Crystal Displays (LCDs), Plasma Display Panels (PDPs), etc., are manufactured by several processes, and all manufacturers perform a reliability test to determine and replace defective flat display panels, prior to marketing or shipment of products.

For example, manufacturers evaluate a reliability of a flat display panel using a vibration or shock tester to evaluate and analyze an endurance of a flat display panel. However, a jig device usable with a flat display panel to assist in the reliability evaluation is desired.

SUMMARY

The present general inventive concept provides a jig device usable with a flat display panel, which can perform vibration and shock tests of a flat display panel, and an endurance test method using the same.

Additional features and/or utilities of the present general inventive concept will be set forth in part in the description which follows and, in part, will be obvious from the description, or may be learned by practice of the general inventive concept.

Features and/or utilities of the present general inventive concept may be achieved by providing a jig device of a flat display panel which includes a frame including a base frame having an opening and a vertical frame which extends vertically along a perimeter of the base frame, and a supporting frame coupled to the base frame within the frame on which the flat display panel is disposed, wherein the supporting frame includes fixing portions provided at corners thereof to support respective corners of the flat display panel.

The frame may be formed in a shape which corresponds to a shape of the flat display panel. The frame may be formed in a rectangular shape.

The base frame may include a plurality of first through-holes to fasten the base frame to a drop table of a shock generating device.

The vertical frame may include a plurality of second through-holes to fasten the vertical frame to a vibrating table of a vibration generating device.

The supporting frame may be detachably coupled to the base frame.

The frame may be made of any one of aluminum, free-cutting steels, bakelite, and compositions thereof which have a high rigidity.

The flat display panel may include coupling holes perforated in the corners thereof, and each of the fixing portions may include a coupling protrusion configured to be inserted into a corresponding one of the coupling holes and having a screw-hole formed therein, and a supporting surface provided at opposite sides of the coupling protrusion to support edge regions of lower and lateral surfaces of the flat display panel around the corresponding corner of the flat display panel.

The supporting surface may be a stepped surface including a lower supporting surface to support the edge region of the lower surface of the flat display panel and a lateral supporting surface to support the edge region of the lateral surface of the flat display panel.

The supporting frame may further include an auxiliary supporting portion which protrudes from a longitudinal side of the supporting frame to support a part of a longitudinal side of the flat display panel.

Features and/or utilities of the present general inventive concept may also be achieved by providing a jig device of a flat display panel which includes a frame including a base frame having an opening and a plurality of first through-holes arranged around the opening, and a vertical frame which extends vertically along a perimeter of the base frame and having a plurality of second through-holes, and a supporting frame coupled to the base frame within the frame and having fixing portions on which corners of the flat display panel are disposed and fixed.

The first through-holes may be used to fasten the base frame to a drop table of a shock generating device, and the second through-holes may be used to fasten the vertical frame to a vibrating table of a vibration generating device.

The flat display panel may include coupling holes in the corners thereof, and each of the fixing portions may include a coupling protrusion configured to be inserted into a corresponding one of the coupling holes and having a screw-hole formed therein, and a supporting surface provided at opposite sides of the coupling protrusion to support edge regions of lower and lateral surfaces of the flat display panel around the corresponding corner of the flat display panel.

Features and/or utilities of the present general inventive concept may also be achieved by providing an endurance test method using a jig device of a flat display panel which includes fixing the flat display panel onto the jig device such that corners of the flat display panel are supported on the jig device to implement a shock or vibration test on the flat display panel, and upon implementation of the shock test, fixing the jig device to a drop table of a shock generating device such that the jig device is placed horizontally on the drop table to apply shock to the flat display panel, or upon implementation of the vibration test, fixing the jig device to a vibrating table of a vibration generating device such that the jig device is placed vertically on the vibrating table to apply vibration to the flat display panel.

The flat display panel may include coupling holes in the corners thereof, the jig device may include a frame including a base frame having an opening and a vertical frame which extends vertically along a perimeter of the base frame, and a supporting frame provided within the frame and having fixing portions on which the corners of the flat display panel are disposed and fixed, each of the fixing portions including a coupling protrusion having a screw-hole formed therein and a supporting surface coming into close contact with an edge of the flat display panel, and the coupling protrusion may be inserted into the corresponding coupling hole, and thereafter a fastening member may be fastened into the screw-hole to fix the flat display panel to the supporting frame of the jig device.

The base frame may include a plurality of first through-holes and the drop table may have a plurality of first fastening holes, and the jig device may be fixed to the drop table as fastening members are inserted and tightened through the first through-holes and the first fastening holes.

The vertical frame may include a plurality of second through-holes and the vibrating table may have a plurality of second fastening holes, and the jig device may be fixed to the vibrating table as fastening members are inserted and tightened through the second through-holes and the second fastening holes.

Features and/or utilities of the present general inventive concept may also be achieved by providing a jig device usable with a test device and a display panel having a display portion, the jig device including a frame having first and second through-holes and a support portion to support and couple the display panel to the frame, wherein the frame has a first orientation with respect to a plane of the test device when mounted to the test device using the first through-holes and a second orientation with respect to the plane when mounted to the test device using the second through-holes.

In the first orientation, the display portion may be substantially parallel to the plane of the test device.

In the second orientation, the display portion may form an angle with the plane of the test device.

An axis of the first through hole may be perpendicular to an axis of the second through hole.

The support portion may include a first supporting surface to support a lower surface of the display panel and a second supporting surface to support a lateral surface of the display panel.

Features and/or utilities of the present general inventive concept may also be achieved by providing a jig device of a display panel which includes a base frame having at least one sidewall, a plurality of first through holes formed in the base frame and a plurality of second through holes formed in the at least one sidewall, and a support frame coupled to the base frame to support portions of the display panel corresponding to locations on which packing members are installed, wherein the base frame is coupled to a tester via the plurality of first through holes to perform a first test on the display panel or via the plurality of second through holes to perform a second test on the display panel.

The first test may be a shock test and the second test may be a vibration test.

BRIEF DESCRIPTION OF THE DRAWINGS

The above and/or other features and utilities of the general inventive concept will become apparent and more readily appreciated from the following description of the exemplary embodiments, taken in conjunction with the accompanying drawings of which.

DETAILED DESCRIPTION OF THE EMBODIMENTS

Figure 1:
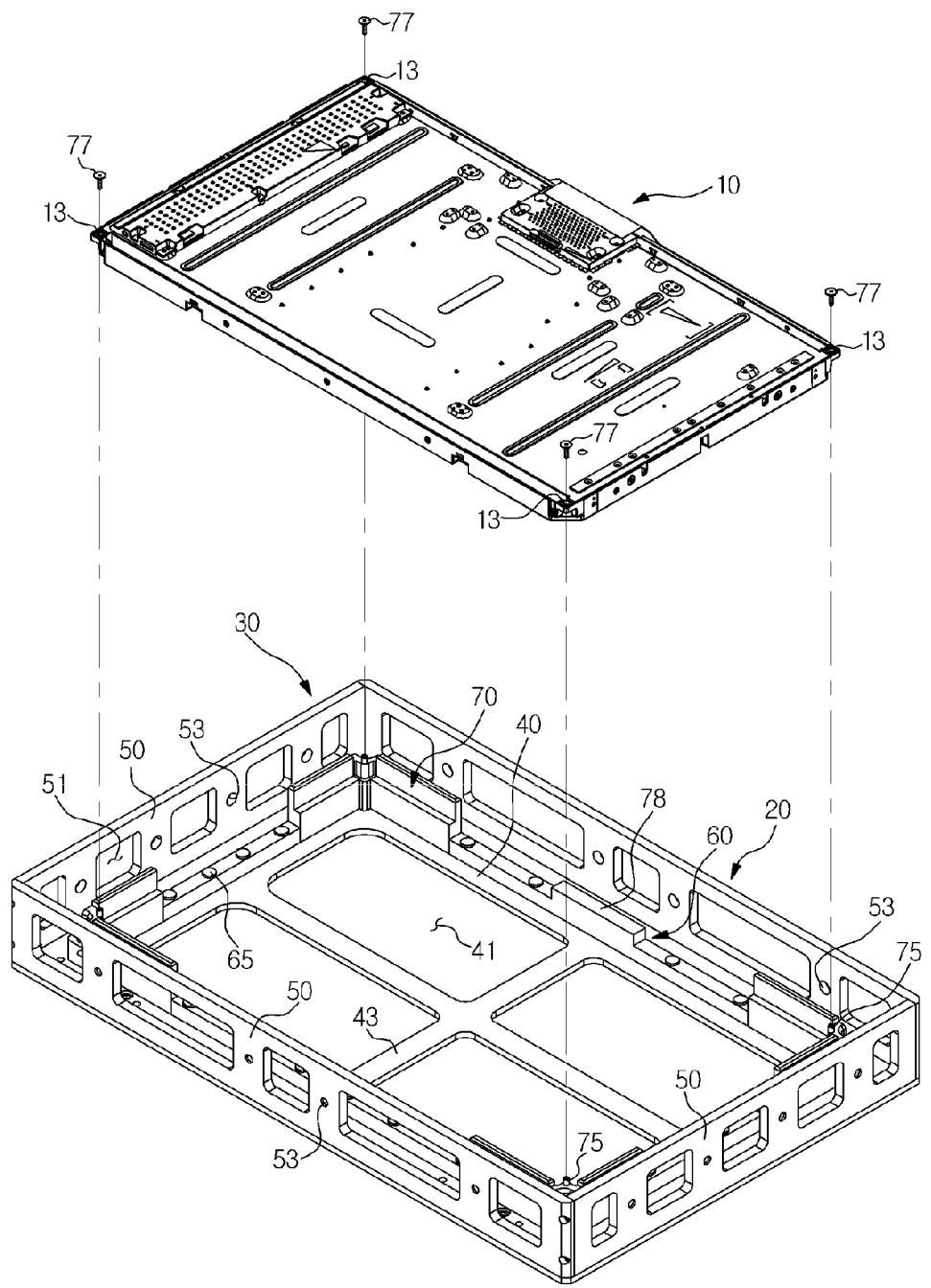
FIG. 1 is a perspective view illustrating a jig device usable with a flat display panel according to an exemplary embodiment of the present general inventive concept.

Reference will now be made in detail to a jig device usable with a flat display panel according to exemplary embodiments of the present general inventive concept, examples of which are illustrated in the accompanying drawings, wherein like reference numerals refer to like elements throughout. The exemplary embodiments are described below in order to explain the present general inventive concept by referring to the figures.

Figure 2:
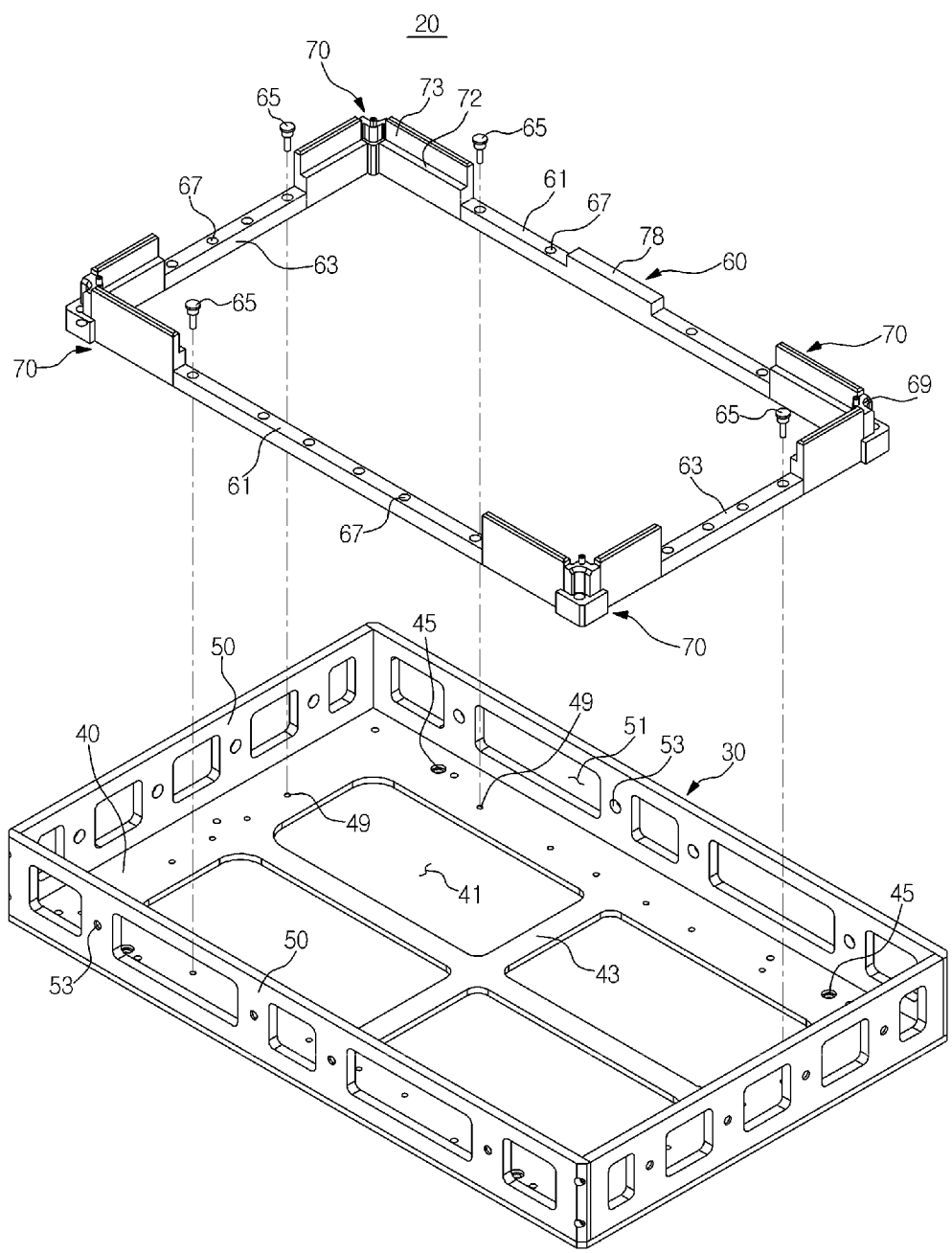
FIG. 2 is an exploded perspective view of the jig device illustrated in FIG. 1.
Figure 3:
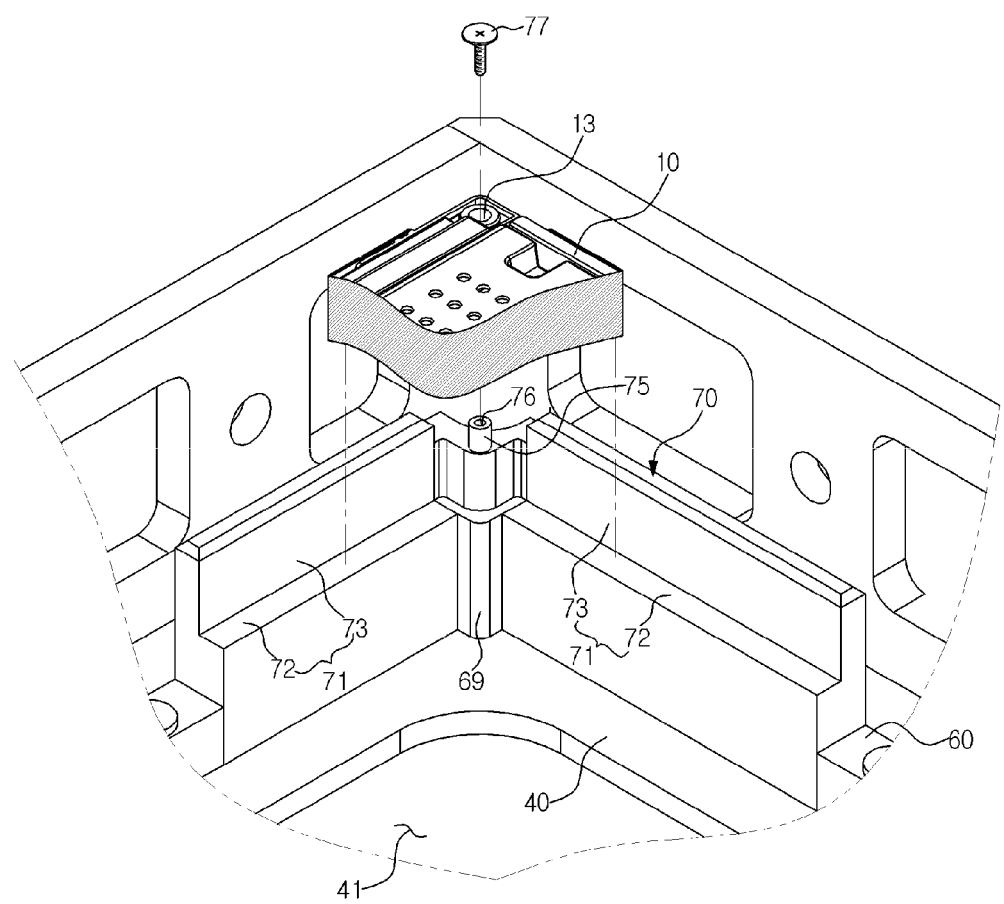
FIG. 3 is a partial cross-sectional view illustrating a coupling relation between a supporting frame and a flat display panel according to an exemplary embodiment of the present general inventive concept.
Figure 4:
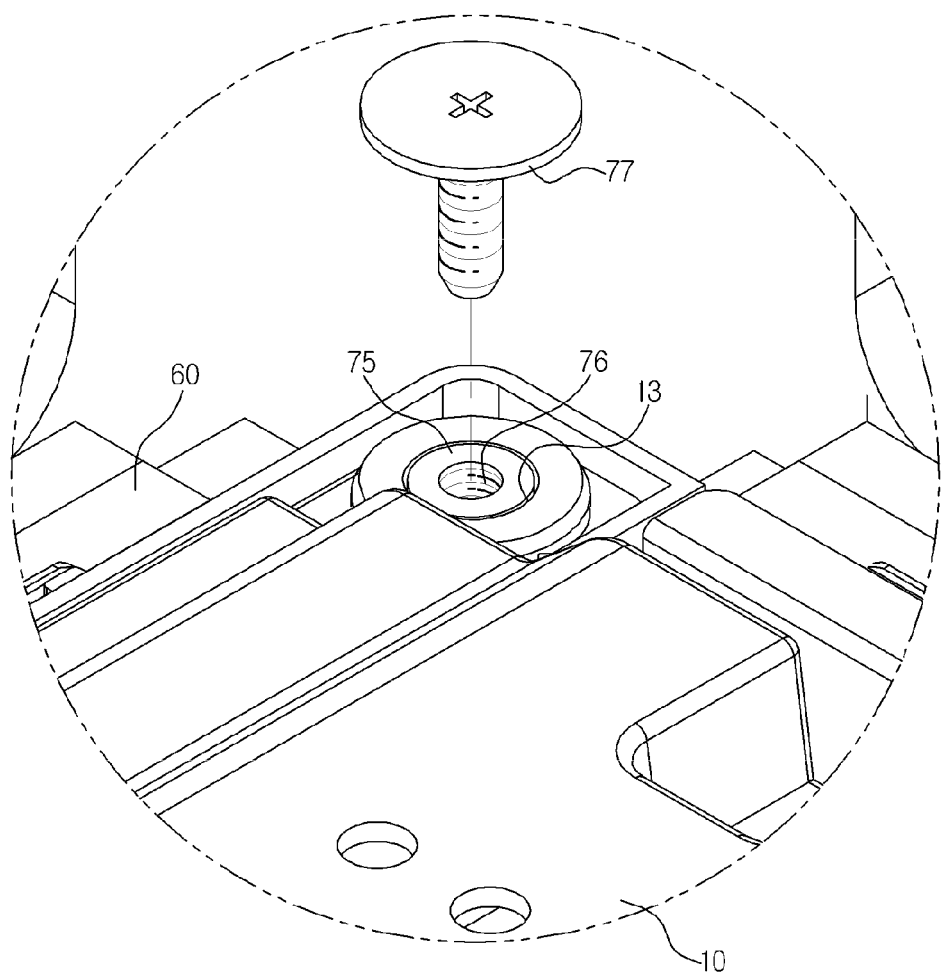
FIG. 4 is a view illustrating a state in which the flat display panel is coupled to the supporting frame according to an exemplary embodiment of the present general inventive concept.

FIG. 1 is a perspective view illustrating a jig device usable with a flat display panel according to an exemplary embodiment of the present general inventive concept, FIG. 2 is an exploded perspective view of the jig device illustrated in FIG. 1, FIG. 3 is a partial cross-sectional view illustrating a coupling relation between a supporting frame and a flat display panel according to an exemplary embodiment of the present general inventive concept, and FIG. 4 is a view illustrating a state in which the flat display panel is coupled to the supporting frame according to an exemplary embodiment of the present general inventive concept.

As illustrated in FIGS. 1 and 2, the jig device 20 usable with the flat display panel 10 according to an exemplary embodiment of the present general inventive concept may include a rectangular frame 30 having a base frame 40 and a vertical frame 50. The base frame 40 may define a bottom of the rectangular frame 30 and may be centrally perforated with an opening 41. The vertical frame 50 can be erected vertically along a perimeter of the base frame 40 and can include front and rear sidewalls which face each other and left and right sidewalls which face each other.

In exemplary embodiments, the base frame 40 may have a rectangular plate shape. However, the present general inventive concept is not limited thereto. That is, in alternative exemplary embodiments, the base frame 40 may have a shape which corresponds to a shape of a flat display panel 10 which is to be evaluated. When the flat display panel 10 is seated and supported on the jig device 20, the opening 41 of the base frame 40 may function to expose a display region 11 of the flat display panel 10 (see FIG. 7), so as to allow an operator to observe the display region 11 with the naked eye. However, the present general inventive concept is not limited thereto. That is, in alternative exemplary embodiments, the operator may utilize an optical inspection device (not illustrated) to analyze the display region 11 of the flat display panel 10.

In exemplary embodiments, a pair of reinforcing frames 43 may be provided adjacent to the opening 41 to reinforce the rectangular frame 30. Specifically, both ends of each reinforcing frame 43 may be connected to respective facing edges of the opening 41 such that the two reinforcing frames 43 intersect at right angles in the opening 41 (see FIG. 1).

Although the present exemplary embodiment describes the reinforcing frames 43 as being provided within the opening 41 that exposes the display region 11 of the flat display panel 10, it may be possible to omit the reinforcing frames 43 to allow the operator to observe any damage to an entire display region 11 of the flat display panel 10 with the naked eye during a shock and/or vibration test of an endurance evaluation.

The vertical frame 50 includes the two pairs of sidewalls which extend upward from an outer edge of the rectangular base frame 40 such that both sidewalls of each pair face each other. In exemplary embodiments, each of the sidewalls may have a plurality of cut-away portions 51 to reduce a weight of the jig device 20 and also to provide access to the flat display panel 10.

In exemplary embodiments, the rectangular frame 30 consisting of the base frame 40 and the vertical frame 50 may be made of e.g., aluminum, free-cutting steels, bakelite, and compositions thereof which have high a rigidity to prevent or substantially reduce deformation due to vibration and/or shock.

The base frame 40 may include a plurality of first through-holes 45, which are spaced apart from one another along a perimeter of the base frame 40 and which are located adjacent to an outer edge of the base frame 40. The first through-holes 45 are provided to correspond to first fastening holes 81 of a drop table 80 (see FIG. 6) of a shock generating device (not illustrated) to fix the base frame 40 to the drop table 80.

The shock generating device can be used for a drop shock test that is one test of the endurance test methods. That is, to test an endurance of the flat display panel 10, the shock generating device applies a shock to the flat display panel 10 fixed on the drop table 80 via the jig device 20 by dropping the drop table 80 from a predetermined height or more.

Figure 6:
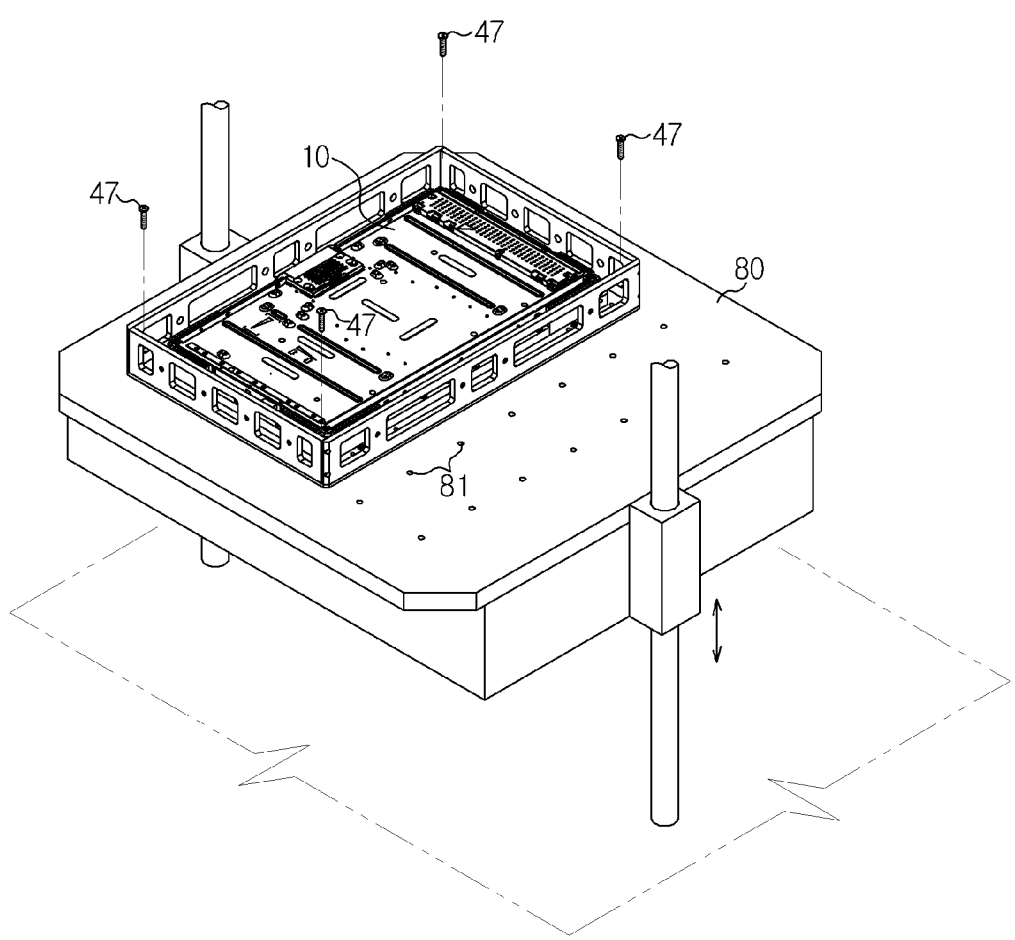
FIG. 6 is a view illustrating an exemplary embodiment in which the jig device according to the present general inventive concept is mounted on a drop table.

In this case, as illustrated in FIG. 6, the rectangular frame 30 can be positioned such that the plurality of first through-holes 45 of the base frame 40 coincide with or correspond to the first fastening holes 81 of the drop table 80. Then, as fastening members 47, for example screws, are fastened through the first through-holes 45 and the first fastening holes 81, a lower surface of the base frame 40 is brought into close contact with and is thereby fixed to the drop table 80 and thus, the rectangular frame 30 is fixed horizontally to the drop table 80.

In exemplary embodiments, the fastening members 47 may be wrench bolts and may be inserted and tightened into the first through-holes 45 and the first fastening holes 81, to thereby securely fix the base frame 40 to the drop table 80.

In addition, the vertical frame 50 may include a plurality of second through-holes 53 spaced apart from one another along a surface of the vertical frame 50. The second through-holes 53 are provided to correspond to second fastening holes 91 of a vibrating table 90 (see FIG. 7) of a vibration generating device (not illustrated), to fix the vertical frame 50 to the vibrating table 90.

The vibration generating device is used for a vibration shock test that is one test of the endurance test methods. That is, to test an endurance of the flat display panel 10, the vibration generating device applies a vibration to the flat display panel 10 which is fixed to the vibrating table 90 via the jig device 20 by vertically vibrating the vibrating table 90 at a predetermined amplitude.

Figure 7:
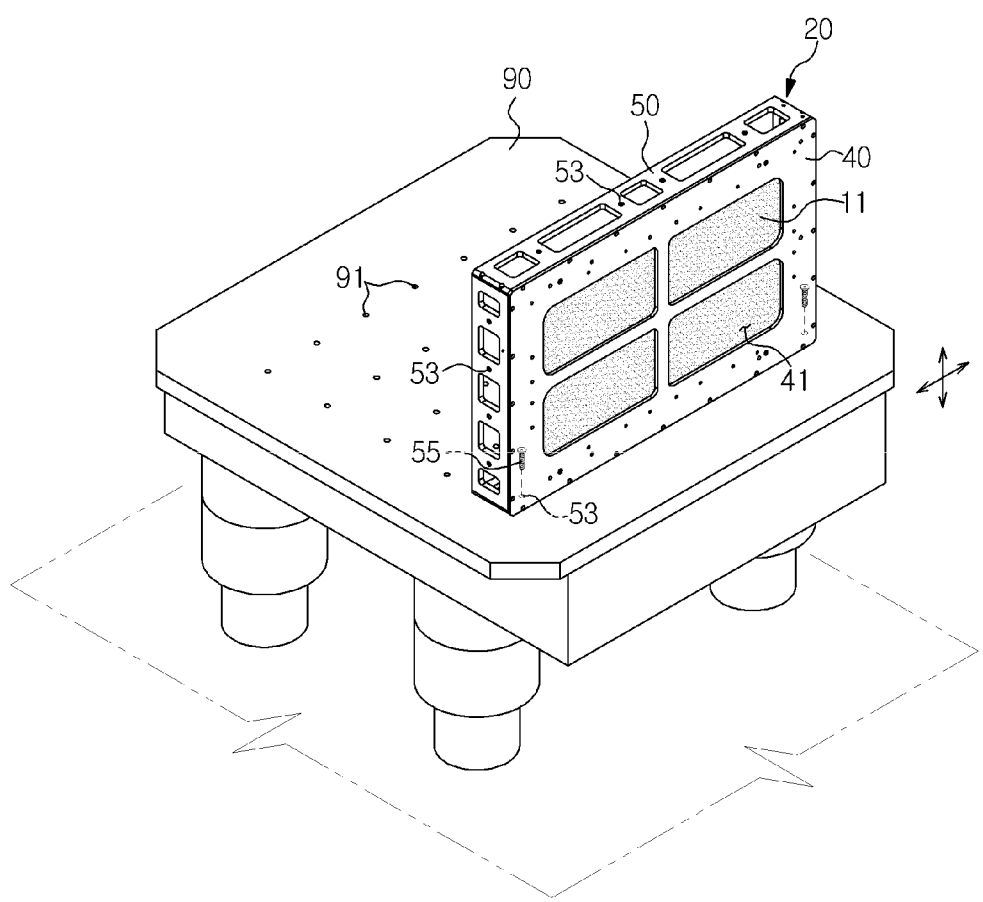
FIG. 7 is a view illustrating an exemplary embodiment in which the jig device according to the present general inventive concept is mounted on a vibrating table.

In this case, as illustrated in FIG. 7, the rectangular frame 30 is positioned such that the plurality of second through-holes 53 of the vertical frame 50 coincide with or correspond to the second fastening holes 91 of the vibrating table 90. Then, as fastening members 55 are fastened through the second through-holes 53 and the second fastening holes 91, a lateral surface of the vertical frame 50 is brought into close contact with and is thereby fixed to the vibrating table 90 and thus, the rectangular frame 30 is fixed vertically to the vibrating table 90.

In brief, to mount the rectangular frame 30 to the shock generating device, after positioning the first through-holes 45 of the base frame 40 to correspond to the first fastening holes 81 of the drop table 80 of the shock generating device, the lower surface of the base frame 40 is securely fixed to the drop table 80 of the shock generating device via the fastening members 47. Also, to mount the rectangular frame 30 to the vibration generating device, after positioning the second through-holes 53 of the vertical frame 50 to correspond to the second fastening holes 91 of the vibrating table 90 of the vibration generating device, the lateral surface of the vertical frame 50 is securely fixed to the vibrating table 90 of the vibration generating device via the fastening members 55.

In this way, both vibration and shock tests may be performed using a single jig device 20 usable with the flat display panel 10 according to the present general inventive concept.

In addition, a supporting frame 60 may be mounted around the opening 41 of the base frame 40 within the rectangular frame 30, such that the flat display panel 10 is disposed and supported on the supporting frame 60.

In exemplary embodiments, the supporting frame 60 may be a rectangular shaped frame consisting of a pair of transversal bars 61 facing each other and a pair of longitudinal bars 63 facing each other. However, the present general inventive concept is not limited thereto. That is, in alternative exemplary embodiments, the supporting frame 60 may be formed in a shape which corresponds to a shape of a flat display panel 10 which is to be evaluated.

In exemplary embodiments, the supporting frame 60 may be integrally formed with the base frame 40, or may be prefabricated and detachably coupled to the base frame 40 via fastening members 65.

In the latter case, the supporting frame 60 may include a plurality of third through-holes 67, through which the fastening members 65 are fastened to fix the supporting frame 60 to the base frame 40, and the base frame 40 may include a plurality of third fastening holes 49 formed at positions corresponding to the third through-holes 67 of the supporting frame 60.

The supporting frame 60 may be provided at respective corners thereof with fixing portions 70. The fixing portions 70 function to support respective corners of the flat display panel 10 seated on the supporting frame 60 and also, to allow the flat display panel 10 to be fixed to the supporting frame 60.

In exemplary embodiments, the fixing portions 70 may be provided to support only the four corners of the flat display panel 10 seated on the supporting frame 60, rather than supporting an entire outer rim or perimeter of the flat display panel 10.

Figure 5:
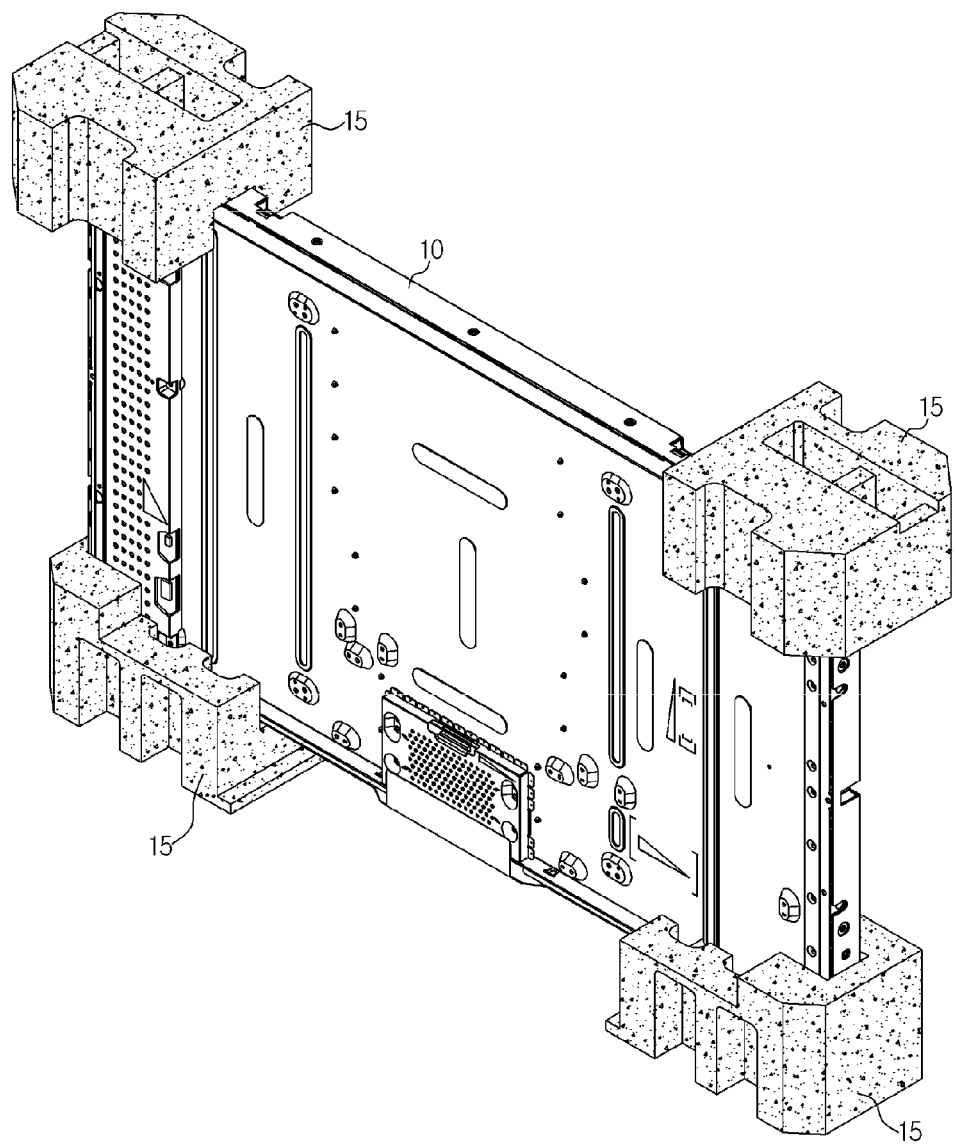
FIG. 5 is a perspective view illustrating a state in which cushioning packaging members are coupled to the flat display panel according to an exemplary embodiment of the present general inventive concept.

In exemplary embodiments, since cushioning packaging members 15 may be coupled to the respective corners of the flat display panel 10 as illustrated in FIG. 5, if the fixing portions 70 are provided to support an entire outer rim or perimeter of the flat display panel 10, there may be inconsistencies between analysis results obtained during an endurance test method and data evaluated via the vibration and shock tests after packaging, thereby resulting in reduced reliability.

On the other hand, if the respective corners of the flat display panel 10 come into contact with the cushioning packaging members 15 of the flat display panel 10 as illustrated in FIG. 5 and the fixing portions 70 are provided at the respective corners of the supporting frame 60 coinciding with the respective corners of the flat display panel 10 such that the flat display panel 10 is seated and fixed on the fixing portions 70, data evaluated via the vibration and shock tests after packaging corresponds to the analysis results obtained during the endurance test methods. That is, in exemplary embodiments, endurance test methods performed on the flat display panel 10 attached to the fixing portions 70 more closely represents actual endurance results when the flat display panel 10 is shipped with cushioning packaging members 15 attached to corners of the flat display panel 10. Acquisition of reliable data based on an endurance test may prevent or substantially reduce a generation of defective products having the flat display panel 10. That is, endurance test methods performed on the flat panel display 10 attached to the fixing portions 70 of the jig device 20 more closely predicts actual endurance results when the flat panel display 10 is shipped with cushioning packaging members 15 attached to corners thereof.

As illustrated in FIG. 3, each fixing portion 70 may include a supporting surface 71 provided at opposite sides of a corresponding corner portion 69 of the supporting frame 60, and a cylindrical coupling protrusion 75 formed at an upper end of the corner portion 69. The supporting surface 71 includes a lower supporting surface 72, on which a partial edge region of a lower surface of the flat display panel 10 around the corner of the panel 10 can be supported, and a lateral supporting surface 73 on which a partial edge region of a lateral surface of the flat display panel 10 around the corner of the panel 10 can be supported. The cylindrical coupling protrusion 75 functions to support and fix the flat display panel 10 seated on the supporting surface 71 to the fixing portion 70.

In exemplary embodiments, the flat display panel 10 seated on the fixing portions 70 is spaced apart from the base frame 40, but corners of the flat display panel 10 come into close contact with the respective supporting surfaces 71. In alternative exemplary embodiments, all four corners of the flat display panel 10 contact at least one supporting surface 71.

Meanwhile, the supporting surface 71 to support the flat display panel 10 may have an area corresponding to a contact area between the cushioning packaging member 15 and the flat display panel 10 under an assumption that the cushioning packaging member 15 illustrated in FIG. 5 has a maximum cushioning force $\sigma_{max}$ to fulfill actual packaging test and distribution conditions.

More specifically, after a maximum cushioning force of the cushioning packaging member 15 is calculated, a contact area between the corresponding cushioning packaging member 15 and the flat display panel 10 is determined based on the maximum cushioning force. In this way, an area of the supporting surface 71 may be determined to correspond to the contact area between the cushioning packaging member 15 and the flat display panel 10.

The coupling protrusion 75 may take the form of a circular or cylindrical shape protruding upward from an upper end of the corner portion 69 of the supporting frame 60, and may have a screw-hole 76 formed therein.

When the corners of the flat display panel 10 are seated on the fixing portions 70, as illustrated in FIG. 4, the coupling protrusions 75 are inserted into coupling holes 13 formed in the four corners of the flat display panel 10 and thereafter, fastening members 77, such as wrench bolts, etc., are fastened into the screw-holes 76 of the coupling protrusions 75 until heads of the fastening members 77 press the flat display panel 10. In this way, the flat display panel 10 may be securely fixed to the supporting frame 60.

In consideration of the case in which the flat display panel 10 has a size of 46 inches or more, each transversal bar 61 of the supporting frame 60 used to support the flat display panel 10 may be centrally provided with an auxiliary supporting portion 78. The auxiliary supporting portion 78, as illustrated in FIG. 2, protrudes upward from the transversal bar 61 to support a part of a longitudinal side of the rectangular flat display panel 10, thus serving to prevent or substantially reduce bending damage or breakage of the flat display panel 10 in a state in which the four corners of the flat display panel 10 are seated and supported on the fixing portions 70 of the supporting frame 60.

In exemplary embodiments, the auxiliary supporting portion 78 may have the same height as that of the lower supporting surface 72 of the fixing portion 70.

Hereinafter, vibration and shock test methods of a flat display panel using a jig device according to an exemplary embodiment of the present general inventive concept will be described.

First, as illustrated in FIG. 3, the flat display panel 10 is seated on the supporting frame 60 of the jig device 20 such that the display region 11 of the flat display panel 10 faces the opening 41 of the base frame 40.

In this case, the coupling protrusions 75 of the fixing portions 70 of the supporting frame 60, as illustrated in FIG. 4, are inserted into the coupling holes 13 formed in the four corners of the flat display panel 10. As the fastening members 77, such as wrench bolts, etc., are inserted into and tightened through the screw-holes 76 of the coupling protrusions 75, the flat display panel 10 may be fixed to the supporting frame 60 in such a way that the partial edge regions of the lower and lateral surfaces of the flat display panel 10 around each corner thereof come into close contact with the corresponding supporting surface 71 of the fixing portion 70.

More specifically, since each corner of the flat display panel 10 is interposed between the supporting surface 71 and the head of the fastening member 77, the flat display panel 10 may be securely fixed to the supporting frame 60 as the head of the fastening member 77 presses the flat display panel 10.

After the flat display panel 10 is fixed to the jig device 20 as described above, a shock test that is one test of endurance test methods may be performed. To this end, as illustrated in FIG. 6, the jig device 20 may be mounted onto the drop table 80 of the shock generating device.

More specifically, in exemplary embodiments, the jig device 20 is placed horizontally on the drop table 80 such that the first through-holes 45 of the base frame 40 of the jig device 20 are aligned with the first fastening holes 81 of the drop table 80, and the fastening members 47 are inserted and tightened through the first fastening holes 81 and the first through-holes 45 to securely fix the jig device 20 to the drop table 80. However, the present general inventive concept is not limited thereto. That is, in alternative exemplary embodiments, the jig device 20 can be fastened to the first fastening holes 81 at an angle with respect to a horizontal surface or plane of the drop table 80.

Then, if the drop table 80 of the shock generating device is dropped to apply a shock to the flat display panel 10, the shock test used to evaluate an endurance of the flat display panel 10 is thereby completed.

Next, a vibration test that is one test of endurance test methods may be performed. To this end, after separating the jig device 20 from the drop table 80 by unfastening the fastening members 47 from the drop table 80, the jig device 20 is moved and fixed to the vibrating table 90 of the vibration generating device as illustrated in FIG. 7.

In exemplary embodiments, the jig device 20 is placed vertically on the vibrating table 90 such that the second through-holes 53 of the vertical frame 50 of the jig device 20 are aligned with the second fastening holes 91 of the vibrating table 90, and the fastening members 55 are inserted and tightened through the second fastening holes 91 and the second through-holes 53 to securely fix the jig device 20 to the vibrating table 90. However, the present general inventive concept is not limited thereto. That is, in alternative exemplary embodiments, the jig device 20 may be fastened to the second fastening holes 91 at an angle with respect to a horizontal surface or plane of the vibrating table 90.

Then, if the vibrating table 90 is vertically vibrated to apply vibration to the flat display panel 10, the vibration test to evaluate endurance of the flat display panel 10 is thereby completed.

In this way, under an assistance of the jig device 20 having a configuration related to that of a product having the flat display panel 10, endurance of the flat display panel 10 may be evaluated by using the vibration and shock generating devices prior to a final fabrication of the product. This may reduce a mass-production period and cost required for manufacturing the flat display panel 10. That is, the jig device 20 according the present general inventive concept allows for a flat display panel 10 to be evaluated for endurance prior to a final fabrication process of a product containing the flat display panel 10, thereby saving manufacturing time and costs incurred when a defective display panel 10 is determined after the product is completed.

As is apparent from the above description, a jig device usable with a flat display panel according to an exemplary embodiment of the present general inventive concept enables acquisition of reliable measurement values with respect to an endurance test of the flat display panel.

Although a few exemplary embodiments of the present general inventive concept general inventive concept have been illustrated and described, it would be appreciated by those skilled in the art that changes may be made in these exemplary embodiments without departing from the principles and spirit of the general inventive concept, the scope of which is defined in the claims and their equivalents.

What is claimed is:

1. A jig device usable with a flat display panel comprising:
   a main frame including a base frame having an opening and a vertical frame which extends vertically along an outer perimeter of the base frame; and
   a supporting frame coupled to the base frame within the vertical frame to support the flat display panel,
   wherein the supporting frame includes fixing portions provided at corners thereof to support respective corners of the flat display panel,
   the flat display panel includes coupling holes in corners thereof, and
   each of the fixing portions includes a coupling protrusion configured to be inserted into a corresponding one of the coupling holes and having a screw-hole formed therein, and a supporting surface provided at opposite sides of the coupling protrusion to support edge regions of lower and lateral surfaces of the flat display panel around the corresponding corner of the flat display panel.

2. The jig device according to claim 1, wherein the main frame is formed in a shape to correspond with a shape of the flat display panel.

3. The jig device according to claim 1, wherein the main frame is formed in a rectangular shape.

4. The jig device according to claim 1, wherein the base frame has a plurality of first through-holes to fasten the base frame to a drop table of a shock generating device.

5. The jig device according to claim 1, wherein the vertical frame has a plurality of second through-holes to fasten the vertical frame to a vibrating table of a vibration generating device.

6. The jig device according to claim 1, wherein the supporting frame is detachably coupled to the base frame.

7. The jig device according to claim 1, wherein the main frame is made of any one of aluminum, free-cutting steels, bakelite, and compositions thereof which have a high rigidity.

8. The jig device according to claim 1, wherein the supporting surface is a stepped surface including a lower supporting surface to support the edge region of the lower surface of the flat display panel and a lateral supporting surface to support the edge region of the lateral surface of the flat display panel.

9. The jig device according to claim 1, wherein the supporting frame further includes an auxiliary supporting portion which protrudes from a longitudinal side of the supporting frame to support a part of a longitudinal side of the flat display panel.

10. A jig device of a flat display panel comprising:
    a main frame including a base frame having an opening and a plurality of first through-holes arranged around the opening, and a vertical frame which extends vertically along an outer perimeter of the base frame and having a plurality of second through-holes; and
    a supporting frame coupled to the base frame within the vertical frame and having fixing portions on which corners of the flat display panel are disposed and fixed,
    wherein the flat display panel includes coupling holes perforated in corners thereof, and
    each of the fixing portions includes a coupling protrusion configured to be inserted into a corresponding one of the coupling holes and having a screw-hole formed therein, and a supporting surface provided at opposite sides of the coupling protrusion to support edge regions of lower and lateral surfaces of the flat display panel around the corresponding corner of the flat display panel.

11. The jig device according to claim 10, wherein the first through-holes are positioned to fasten the base frame to a drop table of a shock generating device via the first through-holes, and the second through-holes are positioned to fasten the vertical frame to a vibrating table of a vibration generating device via the second through-holes.

12. An endurance test method using a jig device of a flat display panel, the method comprising:
    disposing the flat display panel onto fixing portions of the jig device such that corners of the flat display panel are supported on the jig device by inserting coupling protrusions from the fixing portions through coupling holes perforated in the corners of the flat display panel and securing the flat display panel to the jig device with fastening members attached to the coupling protrusions to implement a shock or vibration test on the flat display panel;
    upon implementation of the shock test, fixing the jig device to a drop table of a shock generating device such that the jig device is placed horizontally on the drop table to apply shock to the flat display panel;
    upon implementation of the vibration test, fixing the jig device to a vibrating table of a vibration generating device such that the jig device is placed vertically on the vibrating table to apply vibration to the flat display panel; and
    executing the shock or vibration test.

13. An endurance test method using a jig device of a flat display panel, the method comprising:
    disposing the flat display panel onto the jig device such that corners of the flat display panel are supported on the jig device to implement a shock or vibration test on the flat display panel;
    upon implementation of the shock test, fixing the jig device to a drop table of a shock generating device such that the jig device is placed horizontally on the drop table to apply shock to the flat display panel;

upon implementation of the vibration test, fixing the jig device to a vibrating table of a vibration generating device such that the jig device is placed vertically on the vibrating table to apply vibration to the flat display panel; and executing the shock or vibration test, wherein:

the flat display panel has coupling holes perforated in the corners thereof;

the jig device includes a main frame including a base frame perforated with an opening and a vertical frame which extends vertically along a perimeter of the base frame, and a supporting frame provided within the main frame and having fixing portions on which the corners of the flat display panel are disposed and fixed, each of the fixing portions including a coupling protrusion having a screw-hole formed therein and a supporting surface coming into close contact with an edge of the flat display panel; and the coupling protrusion is inserted into the corresponding coupling hole and thereafter, a fastening member is fastened into the screw-hole to fix the flat display panel to the supporting frame of the jig device.

14. The method according to claim 13, wherein:

the base frame has a plurality of first through-holes and the drop table has a plurality of first fastening holes; and the jig device is fixed to the drop table as fastening members are inserted into and tightened through the first through-holes and the first fastening holes upon implementation of the shock test.

15. The method according to claim 13, wherein:

the vertical frame has a plurality of second through-holes and the vibrating table has a plurality of second fastening holes; and the jig device is fixed to the vibrating table as fastening members are inserted and tightened through the second through-holes and the second fastening holes upon implementation of the vibration test.

16. A jig device usable with a test device and a display panel having a display portion, the jig device comprising:

a frame having first and second through-holes; and a support portion to support and couple the display panel to the frame, wherein the frame has a first orientation with respect to a plane of the test device when mounted to the test device using the first through-holes and a second orientation with respect to the plane when mounted to the test device using the second through-holes, and wherein the display panel includes coupling holes perforated in the corners thereof and the frame includes fixing portions on which corners of the flat display panel are disposed and fixed, each of the fixing portions including a coupling protrusion inserted through the coupling holes and secured with a fastening member to fix the flat display panel to the jig device.

17. The jig device according to claim 16, wherein in the first orientation the display portion is substantially parallel to the plane of the test device.

18. The jig device according to claim 16, wherein in the second orientation the display portion forms an angle with the plane of the test device.

19. The jig device according to claim 16, wherein an axis of the first through hole is perpendicular to an axis of the second through hole.

20. The jig device according to claim 16, wherein the support portion includes a first supporting surface to support a lower surface of the display panel and a second supporting surface to support a lateral surface of the display panel.

21. A jig device of a display panel, comprising:

a base frame having at least one sidewall;

a plurality of first through holes formed in the base frame and a plurality of second through holes formed in the at least one sidewall; and a support frame coupled to the base frame to support portions of the display panel corresponding to locations on which packing members are installed, wherein the base frame is coupled to a tester via the plurality of first through holes to perform a first test on the display panel or via the plurality of second through holes to perform a second test on the display panel, and wherein the display panel includes coupling holes perforated in the corners thereof and the base frame includes fixing portions on which corners of the flat display panel are disposed and fixed, each of the fixing portions including a coupling protrusion inserted through the coupling holes and secured with a fastening member to fix the flat display panel to the jig device.

22. The jig device according to claim 21, wherein the base frame is coupled to the tester in a first orientation for the first test and a second orientation for the second test different from the first orientation.

* * * * *